United States Patent [19]

Gellenbeck

[11] Patent Number: 4,511,175

[45] Date of Patent: Apr. 16, 1985

[54] TRUCK CAB WITH REAR COMPARTMENT AND ENGINE HOUSING

[75] Inventor: Thomas C. Gellenbeck, Indianapolis, Ind.

[73] Assignee: Team Cruiser Conversion Co., Inc., Indianapolis, Ind.

[21] Appl. No.: 541,782

[22] Filed: Oct. 13, 1983

[51] Int. Cl.³ ............................................. B62D 33/06
[52] U.S. Cl. .................................. 296/190; 180/89.14
[58] Field of Search ............................ 296/190, 24 R; 180/89.14, 89.15, 89.16; 5/118

[56] References Cited

U.S. PATENT DOCUMENTS

| | | | |
|---|---|---|---|
| 3,055,699 | 9/1962 | May | 296/190 |
| 3,882,558 | 5/1975 | Chistenson | 5/118 |
| 4,082,344 | 4/1978 | Anderson | 290/190 |
| 4,108,487 | 8/1978 | Spohn | 5/118 |
| 4,121,684 | 10/1978 | Stephens | 180/89.14 |
| 4,201,415 | 5/1980 | Suchanek | 296/190 |
| 4,351,554 | 9/1982 | Miller | 296/24 R |

Primary Examiner—Robert R. Song
Attorney, Agent, or Firm—Woodard, Weikart, Emhardt & Naughton

[57] ABSTRACT

A truck cab having a rear compartment with walkway and bed. A tiltable cab of a tractor-trailer type of truck includes a driver's compartment and a rear compartment. A portion of the doghouse which extends substantially upward into the rear compartment is replaced by a horizontal floor forming a walkway between the side walls of the cab. The floor extends into the remaining portion of the doghouse forming a drawer receiving cavity with a horizontal seat cushion positioned atop the doghouse upon a slidably mounted tray. The tray is moveable forward over the walkway and a back cushion normally mounted to the rear vertical wall is removed therefrom and positioned horizontally adjacent the seat cushion forming a bed extending across the horizontal area of the rear compartment.

11 Claims, 7 Drawing Figures

TRUCK CAB WITH REAR COMPARTMENT AND ENGINE HOUSING

BACKGROUND OF THE INVENTION

This invention is in the field including tractor-trailer types of trucks having rear compartments for sleeping and other purposes. Motor truck cabs are typically mounted on a truck frame to tilt forward to facilitate service of the engine located beneath the cab. In the larger trucks, the cab is provided with a front compartment for holding the driver and passengers and an additional rear compartment provided to serve as a sleeper. For example, such a sleeper is shown in U.S. Pat. No. 3,879,081, issued to Jack E. Hockley and Ciro M. F. Rizzi and No. 4,351,554, issued to Gene H. Miller. It is desirable to provide a rear compartment designed to include many of the amenities typically found in a hotel room due to the desire to minimize the direct cost to the driver and in view of the large amount of time the driver spends on the highway. Several designs of sleeper compartments are on the market and include a variety of storage space and appliances. For example, in U.S. Pat. No. 4,108,487, issued to Larry L. Spohn there is disclosed a plurality of storage bins arranged immediately adjacent a mattress. Different types of mattress suspension systems have also been provided such as shown in U.S. Pat. No. 3,882,558, issued to Sheldon L. Christensen.

A major impediment to effective design of the rear compartment is the existence of the engine beneath the rear compartment along with the doghouse covering extending over the engine and having a generally inverted U-shaped configuration. Thus, a normal horizontal floor has heretofore been impossible due to the existence of the engine hump or covering. To alleviate this problem, one such approach is shown in U.S. Pat. No. 4,121,684, issued to Donald L. Stephens and Herbert H. Izuno wherein the rear compartment is located behind the engine. Such an approach is not always possible due to the undesirability of lengthening the cab and due to the existence of some cabs already on the market which do not extend behind the engine. Disclosed herein is a conversion structure which may be incorporated into cabs during initial construction or subsequent thereto. The conversion structure shortens the length of the conventional engine covering allowing for the installation of a horizontal floor sufficiently low in elevation to form a walkway. A uniquely designed seat and bed structure are positioned efficiently with respect to the walkway to allow use of the entire horizontal area in the rear compartment to serve as a sleeper during the night or as a bench and walkway during other times. Further, the structural relationship between the bench, doghouse and walkway are utilized to store a variety of appliances.

SUMMARY OF THE INVENTION

One embodiment of the present invention is a truck having a fifth wheel for removably connecting a large payload trailer thereto comprising a frame with an engine mounted thereon, a tiltable cab moveably mounted on the frame and extending over the engine, the cab including a driver and passenger front seat portion and a rear compartment, an inverted U-shaped cover mounted to the cab and extending adjacent to separate the engine from the front seat portion, the cover including a top wall with a most forward edge positioned within the rear compartment and substantially rearward of the front seat portion, a rear compartment floor extending between the front seat portion and the cover and extending over the engine substantially lower in elevation than the top wall forming a walkway to support an upright person thereatop between the front seat portion and the cover, and a closure wall fastened to the floor and extending interiorly within and fastened to the cover.

A further embodiment of the present invention is a tractor-trailer type of truck with engine located beneath a tiltable cab within which is located a front driver's compartment and a rear compartment comprising an inverted U-shaped doghouse positioned in the rear compartment and extending adjacent the engine, a horizontal floor forming a walkway within the rear compartment directly behind the front driver's compartment but forward of the doghouse and further extending between the doghouse and the front driver's compartment and extending across the width of the rear compartment, framework positioned above the doghouse forming a refrigerator box cavity and a toilet bowl cavity with the doghouse positioned therebetween, a seat cushion extending across the rear compartment and restable atop the framework aft of the walkway, a backrest cushion extending vertically across the rear compartment and being removably mounted from a vertical position aft of the seat cushion to a horizontal position adjacent the seat cushion forming a bed extending across the walkway and the horizontal area of the rear compartment.

It is an object of the present invention to provide a tractor-trailer type of truck having a rear compartment with a horizontal walkway to support an upright person while utilizing the conventional doghouse engine covering as a support for a bench/bed arrangement.

A further object of the present invention is to provide a new and improved rear compartment for a truck having horizontal space entirely occupied by a bed during sleeping hours and a bench/walkway during other times.

Yet another object of the present invention is to provide means for supporting a seat cushion and back rest which may be moved into adjacent relationship forming a bed within the rear compartment of a truck.

Related objects and advantages of the present invention will be apparent from the following description.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figures 1, 2:
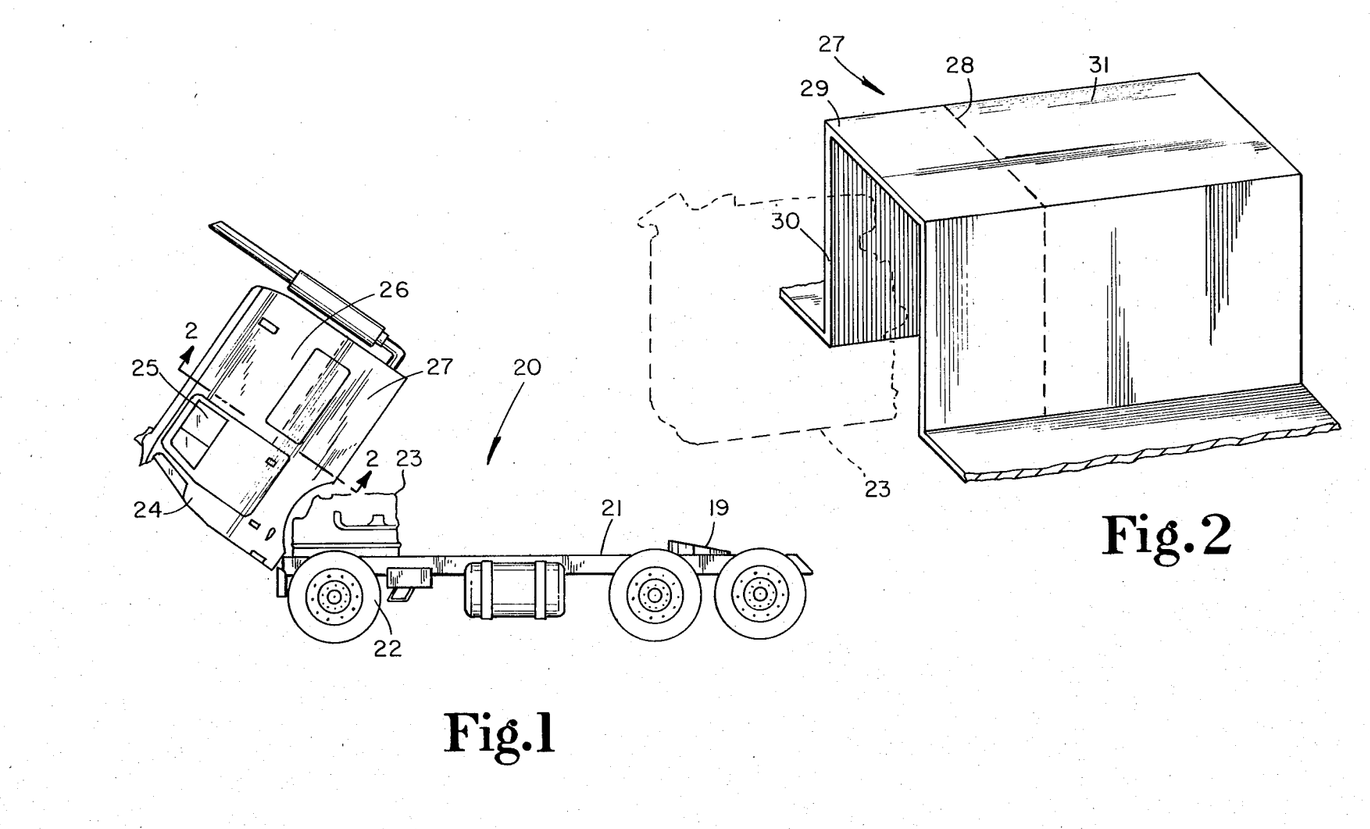
FIG. 1 is a side view of a tractor-trailer type of truck with a cab shown in the tilted position.
FIG. 2 is an enlarged perspective view viewed in the direction generally of line 2—2 of FIG. 1 showing the engine housing mounted within the cab.

Referring now more particularly to FIG. 1, there is shown a tractor-trailer type of truck 20 having a conventional frame 21 with a plurality of wheels 22 rotatably mounted thereon and supporting a conventional truck engine 23. Frame 21 includes a conventional fifth wheel 19 for removably connecting a large payload trailer to the truck. A cab 24 is tiltably mounted to frame 21 by conventional means such as hinges. The cab has sufficient length to extend over and enclose engine 23. Cab 24 includes a front compartment 25 having a driver and passenger seat and a rear or sleeper compartment 26 for holding a mattress and providing storage for a variety of articles.

In the prior art cabs such as shown in FIG. 1, the bottom floor of the cab includes an inverted U-shaped sheet metal covering 27 (FIG. 2) covering and separating at least the rear portion of the engine 23 from the compartments within cab 24. Covering 27 is commonly referred to in the trade as a doghouse and extends substantially upwardly into the rear compartment 26 providing a relatively large hump on the bottom portion of the cab and preventing the establishment of a horizontal walkway within the rear compartment.

Figure 3:
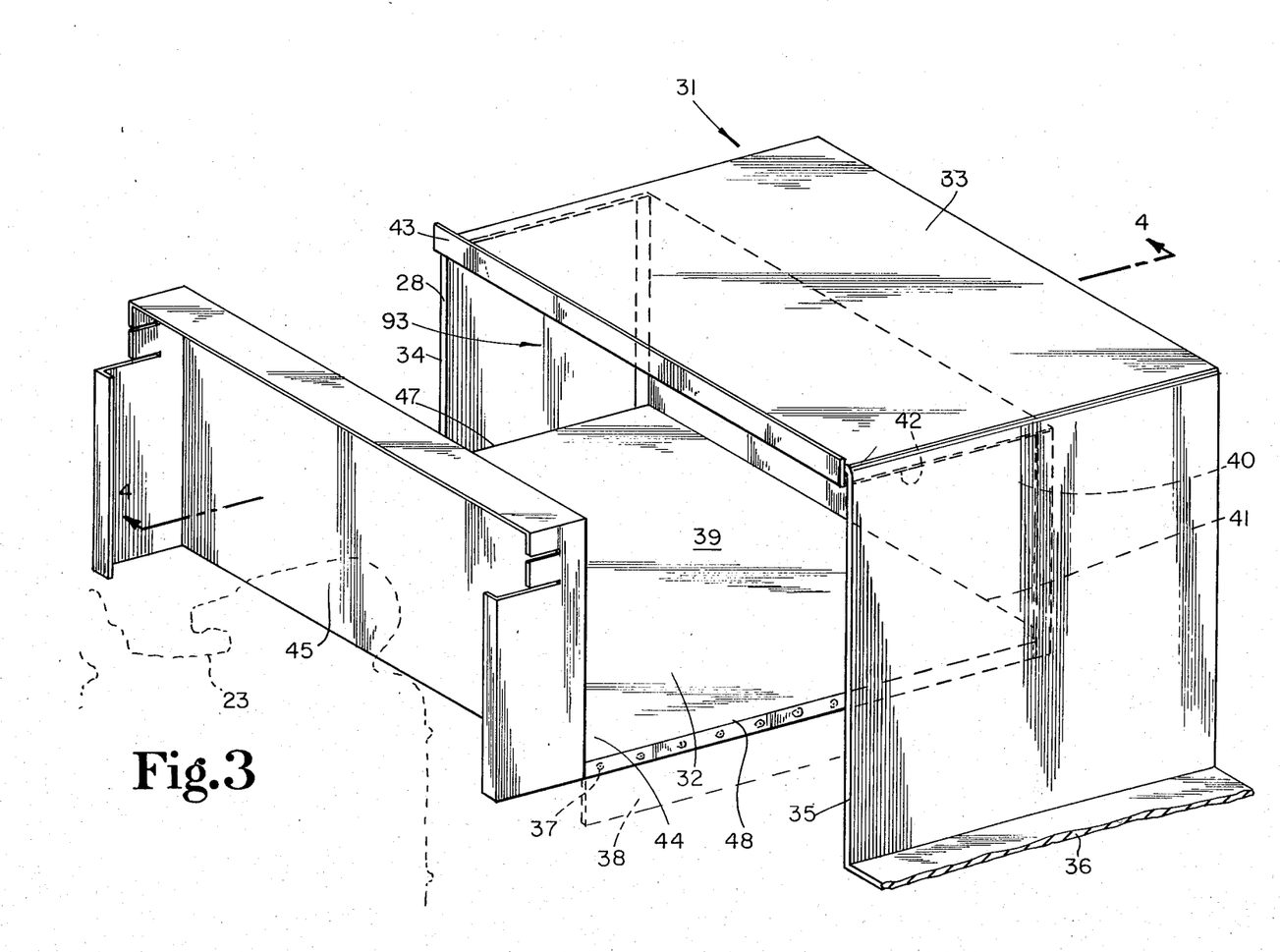
FIG. 3 is a fragmentary perspective view showing the conversion structure for forming the horizontal wall substituted for a portion of the engine housing.
Figure 4:
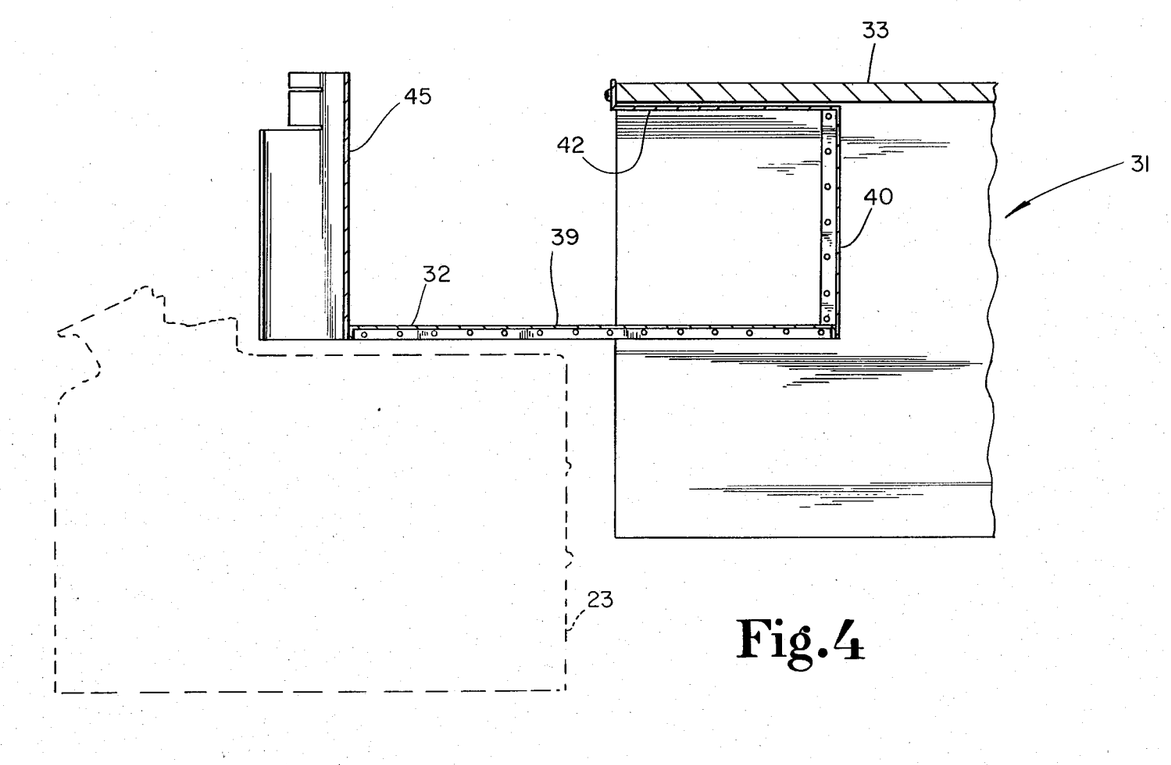
FIG. 4 is a reduced fragmentary cross-sectional view taken along the line 4—4 of FIG. 3 and viewed in the direction of the arrows.

My conversion structure requires housing 27 to be cut along line 28 with the front portion 29 of the housing being discarded and replaced by a horizontal floor structure shown in FIG. 3. The discarded portion 29 has an approximate length from the forward edge 30 to line 28 of fifteen inches. Thus, the doghouse portion 31 includes a forward edge along line 28 located substantially rearward of the front seat portion. The rear portion 31 of housing 28 is left in place. The added horizontal floor structure covers a portion of the engine 23 located therebeneath. The removal of portion 29 and the installation of the horizontal floor is possible since the engine 23 does not extend up to the top wall of the doghouse. In fact, the engine is located substantially below the top wall of the doghouse throughout the first fifteen inches and is located mainly forward of wall 45 thereby allowing the removal of portion 29 and the installation of horizontal floor 32 at an elevation substantially lower than the top wall 33 of doghouse portion 31. It may be necessary with certain engines to relocate the blower and/or air conduits at an elevation lower than as originally constructed.

Doghouse rear portion 31 includes a top wall 33 integrally joined to two downwardly extending spaced apart walls 34 and 35 having bottom flanges 36 provided thereon to bolt to the frame of cab 24.

Horizontal floor 32 is mounted by conventional fastening devices 37 to suitable structure 38 attached to the cab. The floor has a tongue portion 39 sized to extend into doghouse portion 31 between downwardly extending legs 34 and 35. Suitable fastening means may be utilized to secure tongue 39 to doghouse portion 31. Further, a vertical end wall 40 is fixedly attached to end 41 of tongue 39 and extends upwardly immediately beneath top wall 33. A second horizontal wall 42 is attached to the top end of end wall 40 and extends in a forward direction beneath wall 33 having an upwardly extending flange 43 positioned immediately outward and adjacent the leading edge 28 of the housing. Suitable fastening means may be employed to secure flange 43 to edge 28. The opposite forward end 44 of floor 32 is fixedly attached by conventional fastening means to a C-shaped upstanding forward wall 45 mounted to the cab immediately behind the forward or driver's compartment. Wall 45 is sized to fit between the driver's seat and passenger's seat but it is understood that the wall may extend entirely across the width of the rear compartment. Likewise, fixedly attached to or integrally formed with the opposite sides 47 and 48 are floor extensions which extend horizontally outward to the side walls of the rear compartment between forward edge 28 and the front driver's compartment thereby forming a continuous horizontal floor or walkway to support an upright person. The extensions are omitted from FIG. 3 for purposes of clarity but are shown in the plan view of the rear compartment in FIG. 5. Thus, extensions 49 and 50 (FIG. 5) are integral with or attached to floor 39 forming a continuous walkway from side wall 51 to side wall 52 of the rear compartment or at least to the interior wall of closet 60. As will be described later in the specification, the spacing apart of tongue 39 from wall 42 (FIG. 3) and top wall 33 forms a drawer receiving cavity 93 which is designed to slidably receive a plurality of drawers. End wall 40 has an approximate height of fifteen inches thereby locating the horizontal floor 32 substantially lower in elevation than top wall 33.

A pair of forward vertical walls 53 and 54 (FIG. 5) are positioned respectively between the passenger seat and rear compartment and the driver's seat and rear compartment. The inner ends of walls 53 and 54 are spaced apart forming an access or entrance way 55 into the rear compartment with floor 39 and extensions 49 and 50 forming a walkway during the non-sleeping hours. A formica countertop 46 is fixedly mounted to wall 53 and includes a sink 56 supported thereon and connected to a source of water with suitable drainage and pumping means being provided. Further, a mirror and light is provided on the rearward facing surface 57 of wall 53. Countertop 46 extends over the floor extension 49; however, the countertop terminates substantially forward of mattress tray 58 to facilitate the walkway provided by extension 49 to 50.

Figure 5:
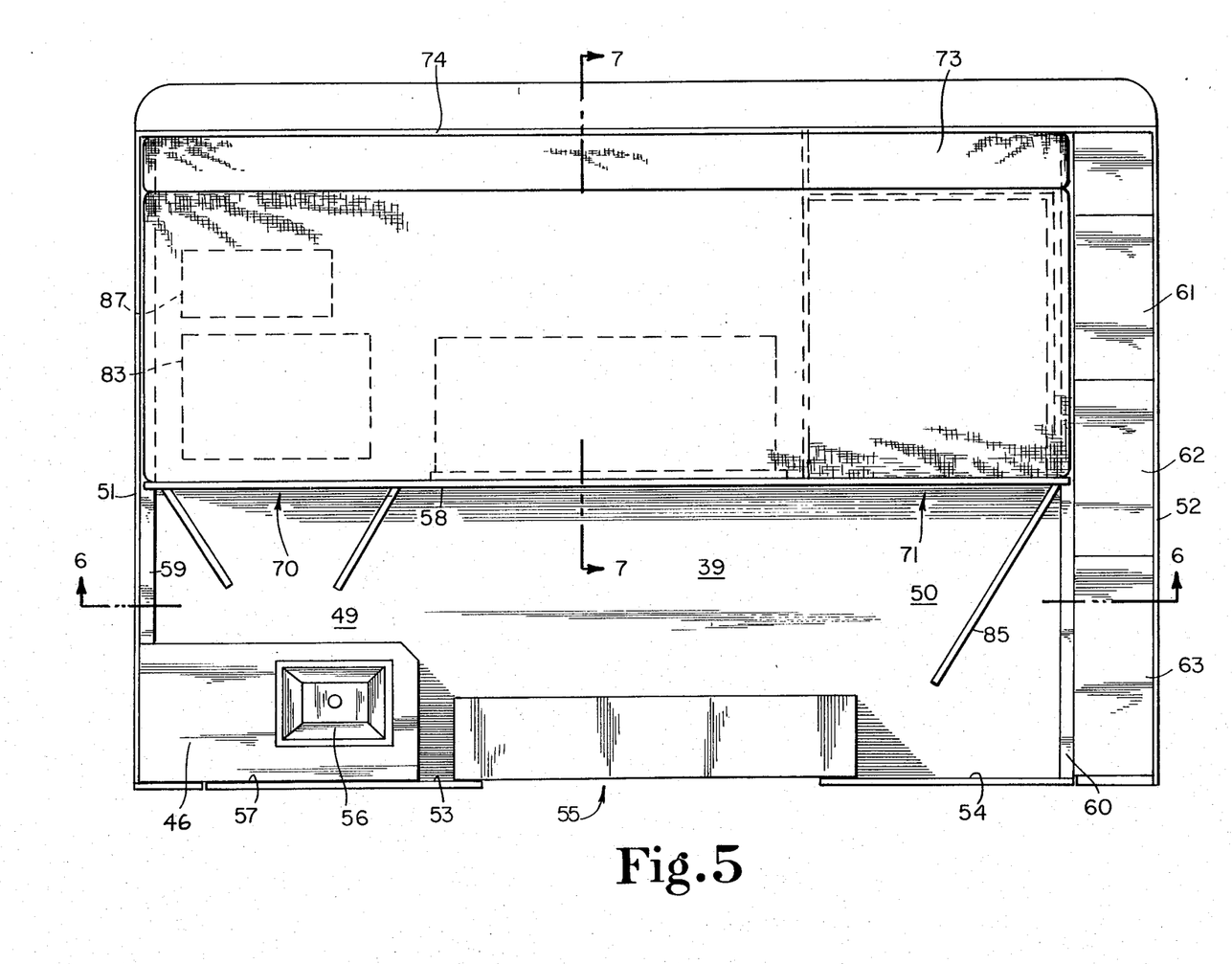
FIG. 5 is an enlarged plan view of the rear compartment of the cab shown in FIG. 1.
Figure 6:
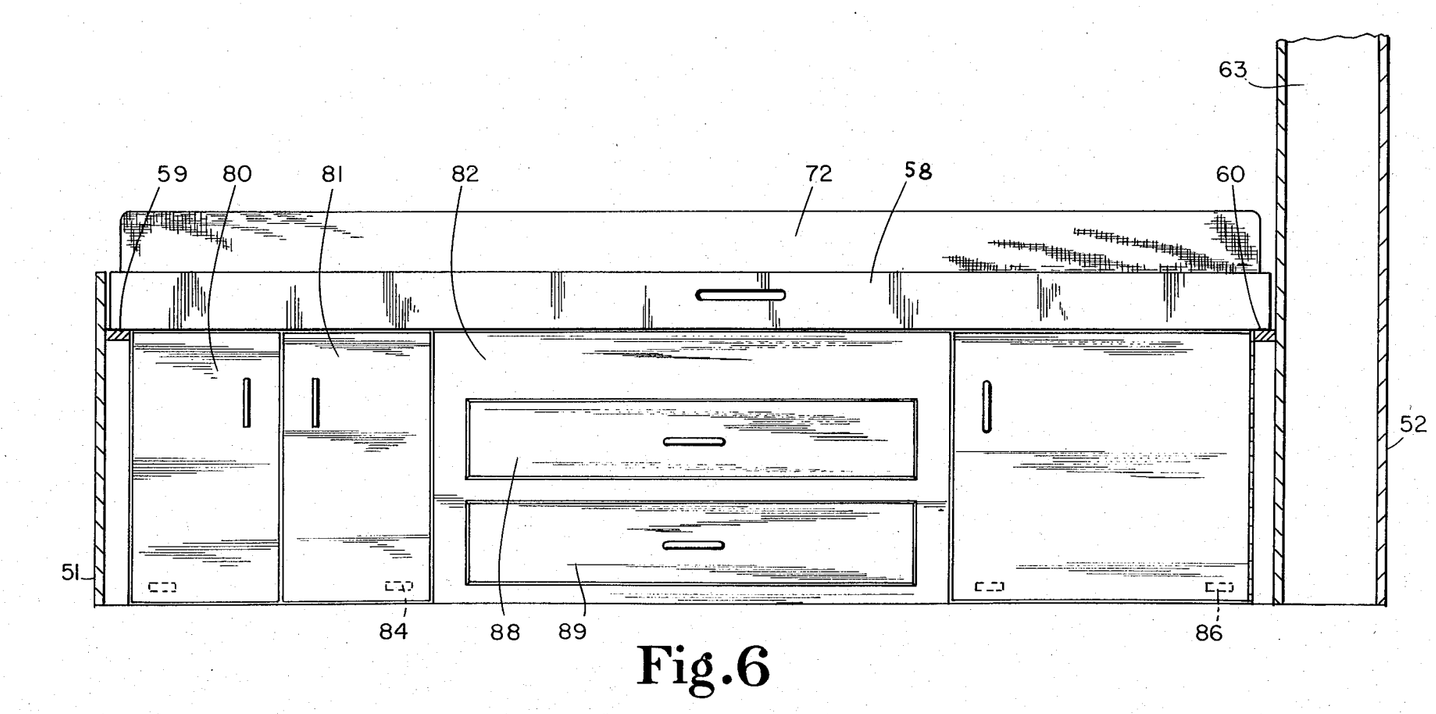
FIG. 6 is a fragmentary cross-sectional view taken along the line 6—6 of FIG. 5 and viewed in the direction of the arrows.

Mattress tray 58 (FIG. 6) extends acros the width of the rear compartment and is supported by a pair of guide rails 59 and 60 as the tray is moved from a position shown in FIG. 5 to a forward position over the walkway formed by portions 49, 50 and floor 39. Rail 59 is positioned immediately adjacent cab side wall 51 whereas rail 60 is spaced slightly apart from cab side wall 52 to provide a plurality of storage containers 61 through 63. Tray 58 provides a framework positioned above the doghouse portion 31 and forms a refrigerator box cavity 70 (FIG. 5) and a toilet bowl cavity 71 with the doghouse positioned therebetween. A seat cushion 72 extends across the rear of the compartment and is restable atop tray 58 which is normally positioned rearwardly of the walkway formed between extensions 49 and 50. A backrest cushion 73 extends vertically across the rear compartment and is removably mounted to the back wall 74 of the cab.

Figure 7:
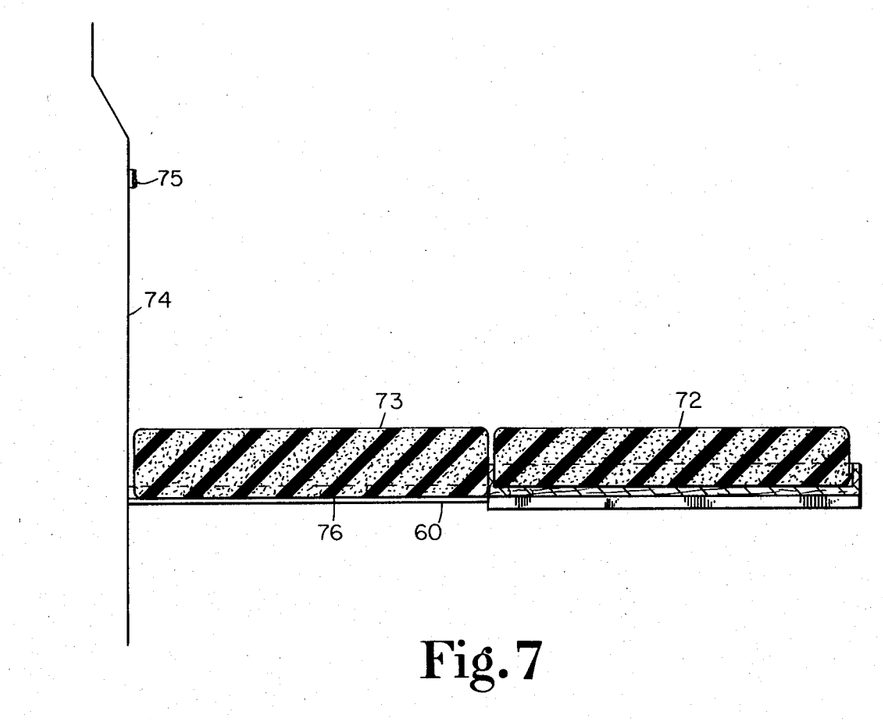
FIG. 7 is a cross-sectional view taken along the line 7—7 of FIG. 5 and viewed in the direction of the arrows with the backrest cushion moved to a horizontal position.

A plurality of synthetic fastening means 75 (FIG. 7) such as sold under the trademark Velco ® by Velcro USA are mounted to rear wall 74 and are engageable with the synthetic fastening means or cloth surface 76 of rear cushion 73. Thus, during non-sleeping hours, cushion 73 is mounted adjacent wall 74 and is secured thereto by fastening means 75 with seat cushion 72 being located in the most aft position upon rails 59 and 60. Thus, the walkway extending between extensions 49 and 50 may be utilized by the person occupying the rear compartment. The compartment may then be turned into a sleeper unit by moving seat cushion 72 forwardly upon rails 59 and 60 to a position above the walkway formed between extensions 49 and 50 and immediately behind and against walls 53 and 54. Countertop 46 is positioned lower in elevation than the seat cushion to thereby support the seat cushion during sleeping hours. Backrest cushion 73 is then removed from wall 74 and placed in a horizontal position upon rails 59 and 60 in the location previously occupied by seat cushion 72. Thus, cushion 72 and 73 extend substantially across the horizontal area of the rear compartment and cover the walkway which is no longer needed (FIG. 7).

A pair of double hinged doors 80 and 81 (FIG. 6) are mounted to a vertical wall 82 immediately beneath tray 58 and enclose cavity 70 which houses a conventional refrigerator box 83. A pair of horizontally extending rails 84 are provided within cavity 70 to allow the refrigerator to be moved outwardly above extension 49 when the doors are open allowing access to the refrigerator. Likewise, another door 85 is hingedly mounted to wall 82 and encloses cavity 71 in which is located a toilet bowl slidably mounted on rails 86 to allow the toilet bowl to be moved outwardly atop extension 50 when in use. A security safe 87 of conventional design is located immediately behind cavity 70 and adjacent refrigerator box 83. The security box is fixedly mounted within the cab with access thereto being provided simply by moving tray 58 and cushion 72 to the forward position. A pair of drawers 88 and 89 are slidably mounted between and to vertical walls 34 and 35 of doghouse portion 31. The drawers extend into drawer cavity 93 (FIG. 3) when not in use and may be moved outwardly over floor 39 when in the open condition. Other utilities are provided in the rear compartment such as air conditioning, heating, sound and video. Suitable storage closets are provided at various locations within the compartment along with adequate lighting.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A truck having a fifth wheel for removably connecting a large payload trailer thereto comprising:
   a frame with an engine mounted thereon;
   a tiltable cab moveably mounted on said frame and extending over said engine, said cab including a driver and passenger front seat portion and a rear compartment;
   an inverted U-shaped cover mounted to said cab and extending adjacent to separate said engine from said front seat portion, said cover including a top wall with a most forward edge positioned within said rear compartment and substantially rearward of said front seat portion;
   a rear compartment floor extending between said front seat portion and said cover and extending over said engine substantially lower in elevation than said top wall forming a walkway to support an upright person thereatop between said front seat portion and said cover; and,
   a closure wall fastened to said floor and extending interiorly within and fastened to said cover.

2. The truck of claim 1 wherein said rear compartment floor extends into said cover and is spaced apart from said top wall forming a drawer receiving enclosure therebetween.

3. The truck of claim 1 and further comprising a seat cushion extending across the width of said rear compartment forming a seat; and,
   a backrest cushion extending vertically across the width of said rear compartment and removably mounted vertically aft of said seat cushion, said backrest cushion horizontally positionable to mount adjacent said seat cushion forming a bed over said walkway and extending over the horizontal area of said rear compartment.

4. The truck of claim 3 and further comprising a pair of spaced apart horizontal guide rails mounted on opposite sides of said rear compartment and extending towards said front seat portion to support said seat cushion when positioned over said walkway.

5. The truck of claim 4 wherein said rear compartment floor extends into said cover and is spaced apart from said top wall forming a drawer receiving enclosure therebetween and further comprising a drawer slidably mounted in said drawer receiving enclosure and slidable out over said walkway when opened and away therefrom when closed.

6. The truck of claim 5 wherein said top wall of said cover is positioned beneath said seat cushion and provides support thereto.

7. The truck of claim 6 and further comprising a plurality of rail tracks mounted beneath said seat cushion and positioned on opposite sides of said cover extending towards said front seat portion; and,
   utility boxes slidably mounted atop said tracks and moveable from beneath said seat cushion to a position over said walkway.

8. A tractor-trailer type of truck with engine located beneath a tiltable cab within which is located a front driver's compartment and a rear compartment comprising:
   an inverted U-shaped doghouse positioned in said rear compartment and extending adjacent said engine;
   a horizontal floor forming a walkway within said rear compartment directly behind said front driver's compartment but forward of said doghouse and further extending between said doghouse and said front driver's compartment and extending across the width of said rear compartment;
   framework positioned above said doghouse forming a refrigerator box cavity and a toilet bowl cavity with said doghouse positioned therebetween;

a seat cushion extending across said rear compartment and restable atop said framework aft of said walkway;

a backrest cushion extending vertically across said rear compartment and being removably mounted from a vertical position aft of said seat cushion to a horizontal position adjacent said seat cushion forming a bed extending across said walkway and the horizontal area of said rear compartment.

9. The truck of claim 8 and further comprising:

a plurality of drawers slidably mounted within said doghouse and moveable to an open position over said walkway;

a refrigerator slidably mounted in said box cavity in a stored condition and moveable to a position over said walkway providing access thereto;

a toilet bowl slidably mounted in said bowl cavity in a stored position and moveable to a position over said walkway providing access thereto;

a pair of spaced apart rails mounted on opposite sides of said rear compartment and extending towards said front driver's compartment slidably supporting said seat cushion, said seat cushion slidable towards said front driver's compartment uncovering a security box receiving cavity positioned adjacent said doghouse and said refrigerator box cavity; and, a security box mounted in said security box receiving cavity to hold valuable objects.

10. The truck of claim 9 and further comprising a tray slidably mounted on said rails and supporting said seat cushion moveable from over said doghouse to over said walkway when said back rest cushion is positioned atop said doghouse forming a bed.

11. The truck of claim 10 wherein said inverted U-shaped doghouse includes a top wall joined to a pair of downwardly extending side walls with said top wall having a forward edge terminating aft of said walkway, said floor includes a tongue extending into said doghouse forming a drawer receiving cavity to receive said plurality of drawers and further comprising:

an end wall connected to and extending vertically upward from said tongue and then horizontally forward beneath said top wall and then vertically upward adjacent said forward edge of said top wall separating said rear compartment from said engine.

* * * * *